(12) United States Patent
Zuverink

(10) Patent No.: US 7,750,825 B2
(45) Date of Patent: Jul. 6, 2010

(54) SYSTEM AND METHOD FOR NAVIGATION OF DISPLAY DATA

(75) Inventor: David Zuverink, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 472 days.

(21) Appl. No.: 11/684,482

(22) Filed: Mar. 9, 2007

(65) Prior Publication Data

US 2008/0218523 A1 Sep. 11, 2008

(51) Int. Cl.
*G08G 1/123* (2006.01)
(52) U.S. Cl. .................. 340/995.15; 340/995.1; 345/671; 455/457; 701/208; 701/212
(58) Field of Classification Search . 340/995.1–995.15; 701/208–212; 345/671, 684, 784; 455/404.2, 455/457, 456.1
See application file for complete search history.

(56) References Cited

U.S. PATENT DOCUMENTS

| | | | | |
|---|---|---|---|---|
| 4,630,065 | A * | 12/1986 | Ichikawa | 340/995.15 |
| 5,945,985 | A * | 8/1999 | Babin et al. | 715/209 |
| 6,460,000 | B1 * | 10/2002 | Nakayama et al. | 702/68 |
| 6,476,831 | B1 | 11/2002 | Wirth et al. | |
| 6,538,670 | B1 | 3/2003 | Kido | |
| 6,559,868 | B2 * | 5/2003 | Alexander et al. | 715/781 |
| 6,750,886 | B1 | 6/2004 | Bergstedt | |
| 6,956,590 | B1 | 10/2005 | Barton et al. | |
| 7,031,728 | B2 * | 4/2006 | Beyer, Jr. | 455/456.3 |
| 7,088,266 | B2 * | 8/2006 | Watanabe et al. | 340/995.1 |
| 7,296,232 | B1 * | 11/2007 | Burdick et al. | 715/738 |
| 2003/0189553 | A1 * | 10/2003 | Goren | 345/173 |
| 2006/0161868 | A1 * | 7/2006 | Van Dok et al. | 715/835 |
| 2006/0195801 | A1 * | 8/2006 | Iwamura | 715/864 |
| 2006/0224315 | A1 * | 10/2006 | Okumura | 701/211 |

FOREIGN PATENT DOCUMENTS

EP 1 571 536 9/2005

OTHER PUBLICATIONS

International Search Report and the Written Opinion issued for PCT/US2008/053950, dated Apr. 7, 2009, 11 pages.
Google Maps; Mobile' "Take the power of Google Maps with you on your mobile phone"; GPS and Google Maps—www.google.com/gmm; p. 1 of 1; Jul. 9, 2007.
Google Maps; Mobile, "Give Google Maps a try using our interactive demo"; www.google.com/gmm; p. 1 of 1; Jul. 9, 2007.
VZ Navigator; Verizon Wireless; "Welcome to VZ Navigator"; www.vznavigator.com; pp. 1-5; Jul. 9, 2007.
Verizon wireless; "Verizon Wireless: Tools & Applications Details"; www.qetitnow.vzwshop.com; pp. 1-2; Jul. 9, 2007.
Verizon wireless; "VZ Navigator—About"; VZ Navigator v3.0; www.vznavigator.com; pp. 1-4; Jul. 9, 2007.

\* cited by examiner

*Primary Examiner*—Brent Swarthout
(74) *Attorney, Agent, or Firm*—Kilpatrick Stockton LLP

(57) ABSTRACT

Navigating display data (e.g., large documents) on an electronic display is described in which a first set of visual indicators are layered over the portion of the portion of data displayed on the electronic display. The user selects a particular navigation task, which selection signal is received by the navigation application. The navigation application determines a section of interest based on the particular navigation task selected and layers a second set of visual indicators over the portion of the display data defined by all of the sections other than the section of interest. The navigation application then animates movement of the display data and both sets of visual indicators on the electronic display according to the particular navigation task selected.

38 Claims, 16 Drawing Sheets

SYSTEM AND METHOD FOR NAVIGATION OF DISPLAY DATA

TECHNICAL FIELD

The present invention relates, in general, to systems and methods for aiding a user in navigating through data for display on a display.

BACKGROUND

Commonly today, display data may be presented on a display for illustrating various types of information to a user. For instance, maps, photographs, videos, and/or other graphic data is commonly presented via a display of an electronic device. Users often desire to navigate through the display data, such as by panning, zooming in, and/or zooming out through the display data. As an example, when viewing a map being displayed, a user may desire to pan through the map to find a location of interest (e.g., a particular portion of a city), and then the user may desire to zoom in on the location of interest to view greater detail about such location (e.g., street names, etc. in the particular portion of the city). Challenges arise in enabling a user to navigate efficiently through the display data, particularly in a manner that aids the user in not becoming "lost" within the display data. That is, it becomes desirable to aid a user in navigating through display data in a manner that the user can understand where within the display data he/she is navigating.

Particular navigation challenges are presented when displays are small and/or when the user input available for controlling the navigation is limited. Many devices provide small displays and/or limited user input for controlling navigation. For instance, electronic devices such as mobile phones, personal digital assistants (PDAs), and the like, often have small screen displays wherein a user may desire to navigate through information, such a map, a large spread sheet, a large graphic, or the like, that exceeds the display area of the screen. In such case, only a small portion of the information may be presented at a given time on the small screen display, and it becomes desirable to assist a user in navigating through the information while maintaining a sense of how the information fits together. On desktop computers, the screen is typically large enough to display a section of a map that is large enough to make out details, such as street names, terrain features, and the like, as well as show a sufficient amount of area around a specific area of interest. With the larger screen and a pointing device, the user has many options to effectively interact with the map. To zoom into a specific area, a user can continually select that area with a zoom tool. The user may also get an area of interest to show up in the center of the device display by clicking on that part of the map while in a "click to re-center" mode. Alternatively, a user may select and drag that part of the map to bring it into the center of the display screen.

Having much smaller screens, mobile phone and PDA users will typically need to zoom closer into a map, a graphic, spreadsheet, or the like, to make out details such as street names, illustration details, cell entries, and the like. It generally takes many steps of panning and zooming to get a particular area of interest to show up at the desired size and position on the display screen. At such a detailed view, the user may not easily be able to look at the area surrounding the area of interest represented on the screen without executing many additional panning and zooming steps, which may cause the user to lose context of the area of interest the user initially desired to see. Overall, instead of feeling like holding a portable foldable map in your hands, the resulting experience is more like interacting with a wall-sized map by looking through a cardboard tube and then walking closer or farther from the wall to zoom in and out. Further, many such electronic devices provide only limited user input ability for controlling the navigation. For instance, a mobile telephone may only provide a 5-way input interface that includes 4 directional inputs (e.g., left, right, up, and down buttons) and 1 selection input (e.g., an OK button). This may further increase the user's difficulty in navigating through display data.

In the mobile map application space, map and direction providers present a requested map to a user on a mobile phone or PDA connected to the Internet. Examples of such mobile mapping and directions applications are Google, Inc.'s GOOGLE™ Maps Mobile (GMM), and Verizon Wireless' VZ NAVIGATOR$^{SM}$. In GMM, the user downloads the GMM software to the particular mobile phone or PDA, which then interacts via the Internet or wireless provider system with the map databases operated by Google, Inc. In response to a request from a user, a portion of the map is generally downloaded to the user's device, with the particular area of interest being centered on the small screen of the device. The GMM application provides a user interface (UI) for the user to interact with the map by panning in four directions, zooming in, zooming out, re-centering, and the like. When panning around the map, only small movements are made in any of the selected directions. More of the map is downloaded to accommodate this panning. However, the limitation of small panning movements makes it difficult to quickly look at the area surrounding the current view if the user desires to get a sense of where the current view is in relation to the larger area of the map.

While the small panning steps make such localized panning more difficult, larger palming steps would not necessarily solve this difficulty in a desirable manner. If the UI simply panned further with each key press, the user would tend to lose track of where they are on the map if it moves too far from its previous position. Therefore, when the user selects to pan in any particular direction, only a very small amount of distance is moved, in order to preserve the user's context in interacting with the subject map. However, even with limiting the amount of movement between each series of pans, the user's experience may be tenuous because there is also nothing that conveys what is happening to the user as the user operates the interface controls.

In one feature of GMM, the zoom feature, GMM inserts a rectangle over the area in the middle of the screen that either is to be zoomed into or indicates the area from which the display was zoomed out from. The rectangle loosely frames the area on the screen that has or is to be expanded or zoomed into. However, the rectangle is only placed onto the display screen after the user indicates to perform one of the zoom directions. Thus, there is no indication to the user in advance of activating the feature as to what may happen when it is activated.

BRIEF SUMMARY

The present invention and its various embodiments are directed to systems, methods, and computer program products for navigating through data for display on a display. A navigation application is provided which is operable (e.g., computer-executable) to aid a user in navigating through display data, such as through a graphic being displayed on a display. In certain embodiments, the navigation application presents visual indicators (or cues) on the display to divide the display data into a plurality of sections. For instance, grid lines may be overlaid on the display data to divide the display data into a plurality of sections defined by such grid lines. Furthers various navigation functions, such as panning zooming-in, and zooming-out, may be supported by the navigation application, wherein the displayed visual indicators may be used to aid a user in understanding the navigation operation being performed. For instance, animated movement of the visual indicators may be performed to provide a visual reference to the user regarding the navigation through the display data. Thus, for example, animated movement of the visual indicators may provide a visual indication of the performance of such navigation functions as panning, zooming in, and/or zooming-out through the display data, while aiding the user in maintaining some reference as to the location within the overall display data to which the display has navigated.

In one exemplary embodiment; a first set of visual indicators, such as grid lines, boxes, or the like, are layered over the portion of the document displayed on a display. The user selects a particular navigation task, which selection signal is received by the navigation application. The navigation application determines a section of interest from one of the multiple sections visually dividing the document portion based on the particular navigation task selected. A second set of visual indicators, such as shading, coloring, or the like, is then layered over the portion of the document defined by all of the sections except for the section of interest. The navigation application will then animate movement of the document portion and both sets of visual indicators on the device display according to the particular navigation task selected.

In certain embodiments, the navigation application analyzes the display data and determines the visual indicators to display based on the display data. For example, in one embodiment, the visual indicators are determined to divide the display data into a plurality of sections, wherein the sections may be of different sizes depending on the concentration of display data presented at the corresponding portion of the display. For instance, a greater number of smaller sections may be formed for areas of the display which contain highly concentrated display data, whereas a fewer number of larger sections may be formed for areas of the display that contain less concentrated display data. In this manner, in certain embodiments the visual indicators generated by the navigation application may dynamically vary depending on the display data being presented on the display. In other embodiments, the navigation application may generate an arrangement of visual indicators that is not dependent on the display data being presented.

In many cases, the navigation application is employed to navigate to data that is not currently being displayed on the display. In many cases, display data exceeds the size of a given display screen. For instance, a user may pan to a portion of the display data that is not currently visible on the display. For example, the display data to which the user desires to navigate may reside above, below, or to one side of the currently-displayed data being presented on the display. As another example, the display data to which the user desires to navigate may become visible only as the user zooms in or zooms out on the currently-displayed data. Thus, navigation of display data may involve navigating to data that is not currently visible on the display. As described further herein, certain embodiments of the present invention enable a user to perform such navigation of display data in a manner that aids the user in recognizing how, in reference to the currently-displayed display data, a given navigation unction moves to another portion of the display data (e.g., to a portion of the display data previously not visible on the display screen).

The navigation application of certain embodiments of the present invention may be employed for navigating through any of various types of display data, such as map data (as may be presented by a mapping application), photographic data, video data, video-game data, etc. Such navigation application may be integrated as part of a presentation or viewing application that generates and/or presents the display data to a user, and/or the navigation application may be used in conjunction with such presentation or viewing application for allowing a user to navigate through the display data output by such presentation or viewing application to a display.

While embodiments of the present invention are not limited in application to any particular type of data or display device, exemplary techniques employed by embodiments of the navigation application may be particularly advantageous for use in navigating through display data in certain environments. For instance, the navigation application of certain embodiments may be particularly advantageous for use in navigating through display data presented on a small-screen display, such as a small-screen display of a mobile telephone, PDA, portable media player, digital camera, etc. Additionally or alternatively, the navigation application of certain embodiments may be particularly advantageous for use in navigating through display data presented by a system in which user input for navigation control is limited. For instance, many electronic devices, such as mobile telephones, often have limited support for user input for controlling navigation through display data. For example, the user input may be limited to directional input (e.g., up, down, left, and right) and selection input (e.g., an "OK" button). Various other input device configurations provide limited user input for navigating through display data. Additionally, in some instances, even though a device, such as a personal computer, may provide great flexibility to a user in inputting navigation commands (e.g., using a mouse, etc.), a user may desire to use a more limited subset of inputs, such as the directional inputs (e.g., up, down, left, and right arrows on a keyboard) and selection input (e.g., Enter key on the keyboard) to navigate through display data, wherein certain embodiments of the navigation application may be employed in any such environment to assist a user's navigation through display data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the are that such equivalent constructions do not depart from the spirit and scope of the invention as set forth in the appended claims. The novel features which are believed to be characteristics of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing in which.

DETAILED DESCRIPTION

Figure 1A:
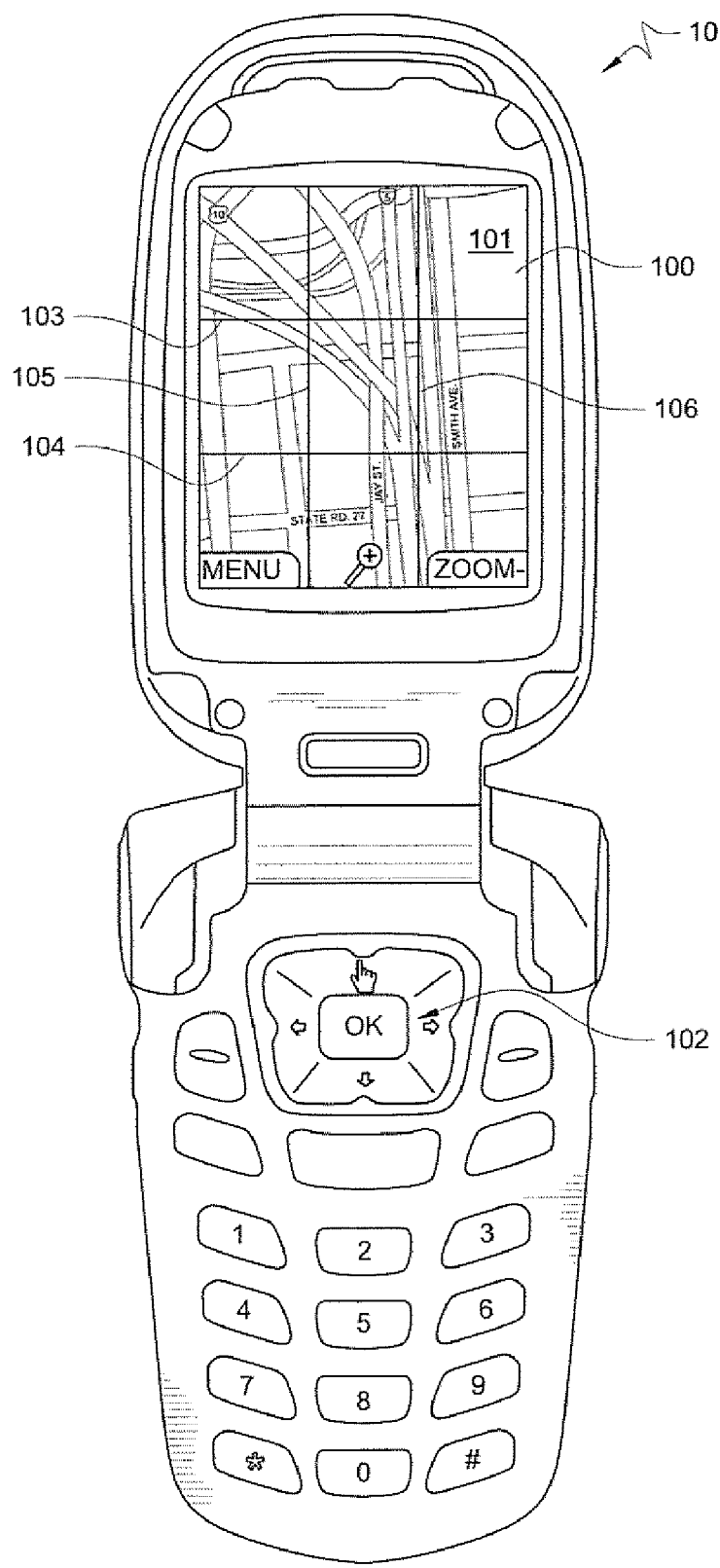
FIG. 1A is a diagram illustrating a mobile phone operating a map application that uses a navigation system with a panning feature configured according to one embodiment of the present invention.

FIG. 1A is a diagram illustrating mobile phone 10 operating a map application that uses a navigation application configured according to one embodiment of the present invention. The navigation application may support one or more navigation functions, such as panning, zooming-in, and/or zooming-out to enable a user to navigate through display data, such as a map presented by the map application. The example of FIGS. 1A-1E illustrate an exemplary panning unction that is supported by the navigation application. Mobile phone 10 includes display 100 with map 101 displayed thereon. Mobile phone 10 also includes navigation pad 102, which provides a 5-way input interface for the user to interact with the content on display 100. The navigation application of the map application causes a first set of visual indicators or dividers, such as grid lines 103-106, to be overlaid on top of map 101. Grid lines 103-106 divide display 100 into nine sections having an aspect ratio equivalent to that of display 100.

It should be noted that in operation of additional and/or alternative embodiments of the present invention, grid lines 103-106 may be rendered in any different number of ways, such that the lines may be visible to the user but not so dark so as to interfere with perception of the underlying content. Moreover, in various additional and/or alternative embodiments of the present invention, the positions of grid lines 103-106 may also be editable by a user.

It should further be noted that in additional and/or alternative embodiments of the present invention, display 100 may be divided into a different number of sections which would not have to share the same or similar aspect ratio of display 100. The present invention is not limited to merely the example embodiment illustrated in FIG. 1A.

Figure 1B:
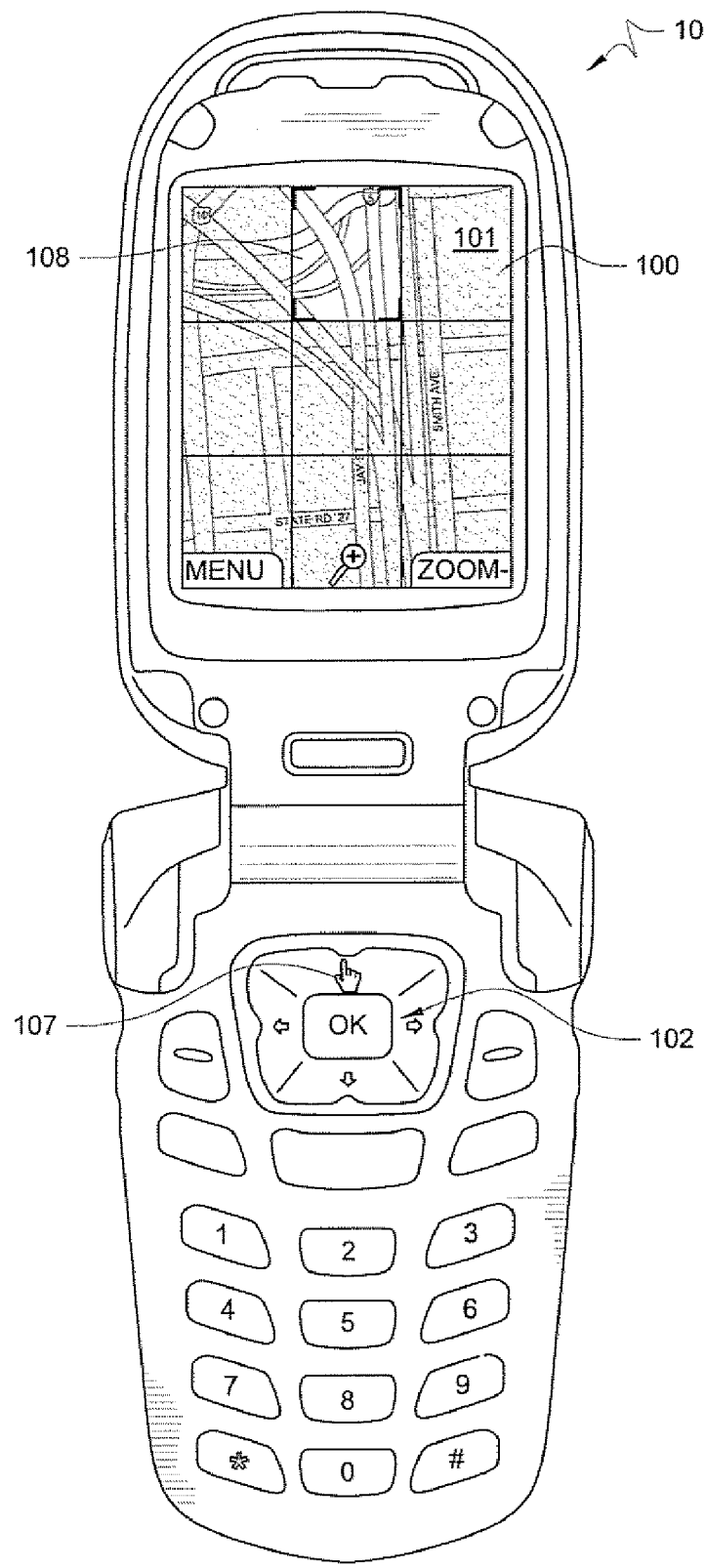
FIG. 1B is a diagram illustrating the mobile phone of FIG. 1A operating the panning feature configured according to one embodiment of the present invention.
Figure 1C:
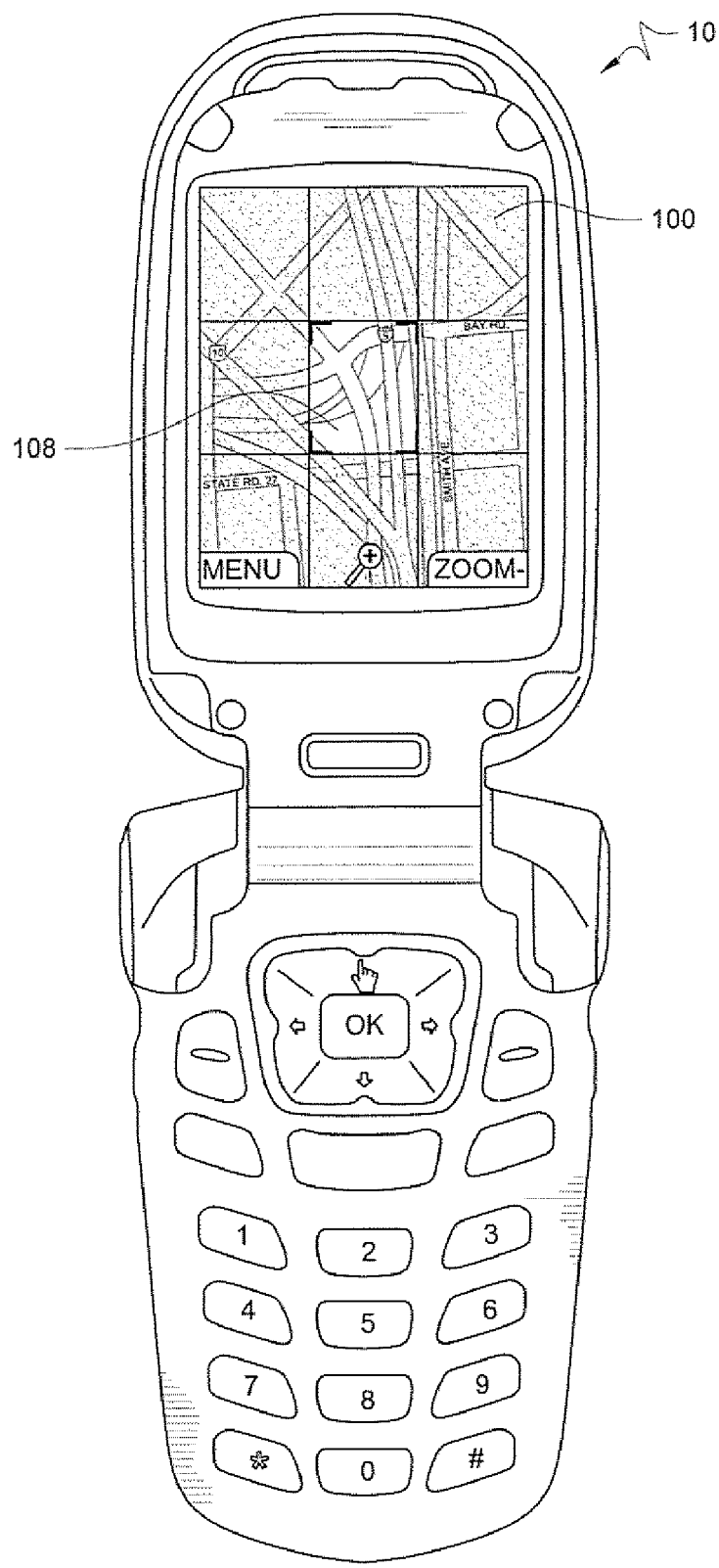
FIG. 1C is a diagram of the mobile phone of FIG. 1A which illustrates a section in the center of the phone's display.
Figure 1D:
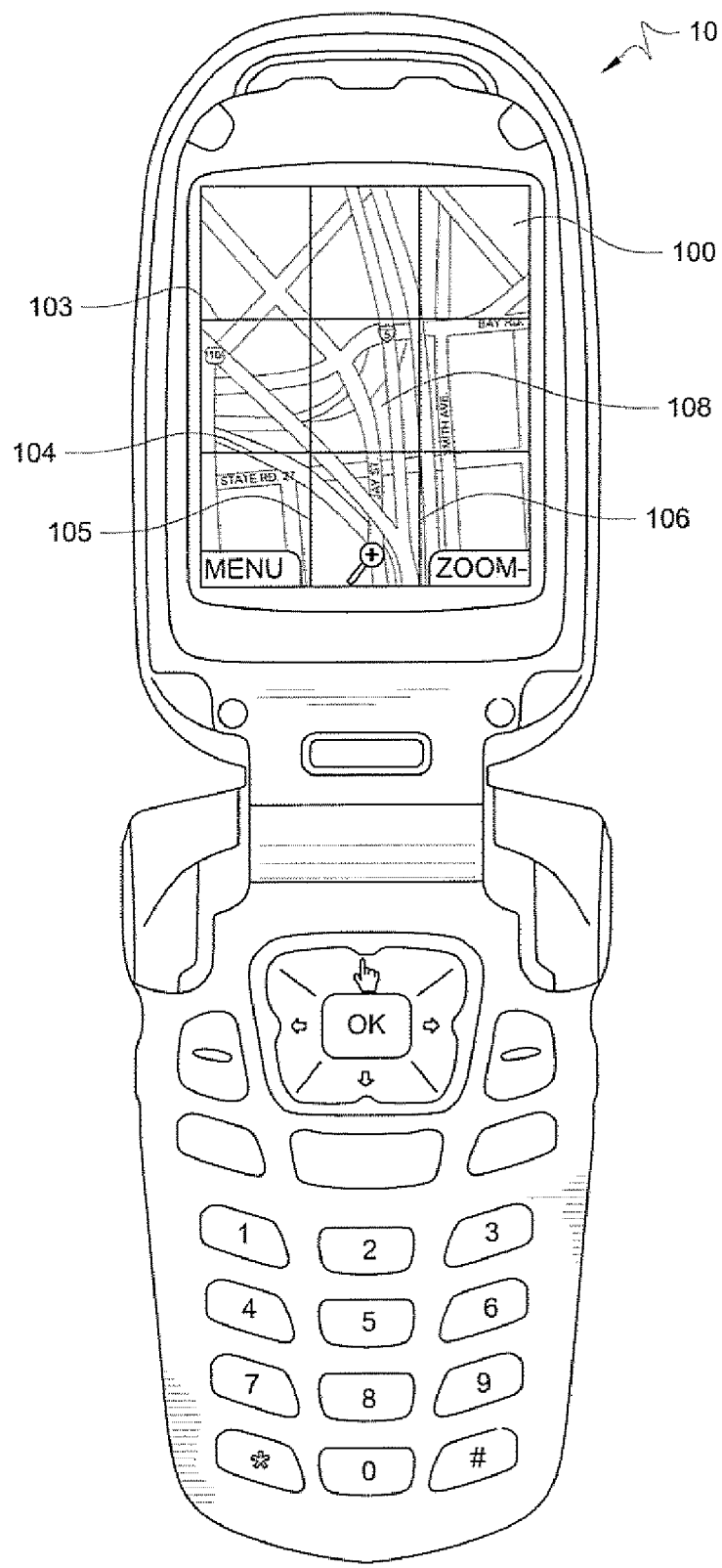
FIG. 1D is a diagram illustrating the mobile phone of FIG. 1A after completing the panning animation of the panning feature configured according to one embodiment of the present invention.

FIG. 1B is a diagram illustrating mobile phone 10 operating the panning unction according to one embodiment of the present invention. When the user desires to pan up or move laterally up from map 101 displayed on display 100, he or she manipulates navigation pad 102 at point 107 (i.e., activates the up directional-input button 107). When the entry at point 107 is received, the panning function places a second set of visual indicators, such as shading, over each of the display sections defined by grid lines 103-106 (FIG. 1A), except for section 108. This shading de-emphasizes each of the sections created by grid lines 103-106, except for section 108, which was determined by the panning function to be the section of interest. As the top-most section of map 101 displayed on display 100, this is the section that will be moved to the center of the display. The user's attention is, therefore, drawn to section 108, indicating that some operation will occur with regard to section 108. FIG. 1C is a diagram of mobile phone 10 which illustrates section 108 in the center of display 100 as a result of the above-described operation in FIG. 1B. The map application with the panning function configured according to one embodiment of the present invention takes section 108 at the top of display 100 (FIG. 1B) and animates it from that position to the center position, as illustrated in FIG. 1C. The portion of the map that had been above the top of display 100 (and thus not originally visible on the display 100 in FIG. 1A) is then rendered as the new top row as the map is panned down. Similarly, the bottom row that was originally visible on display 100 in FIG. 1A is moved off the bottom of display 100 as the map is panned down. When the painting animation and operation is complete, the visual pan indicator, i.e., the shading, is removed from the other grid sections to reveal the newly positioned map, as illustrated in FIG. 1D.

Figure 1E:
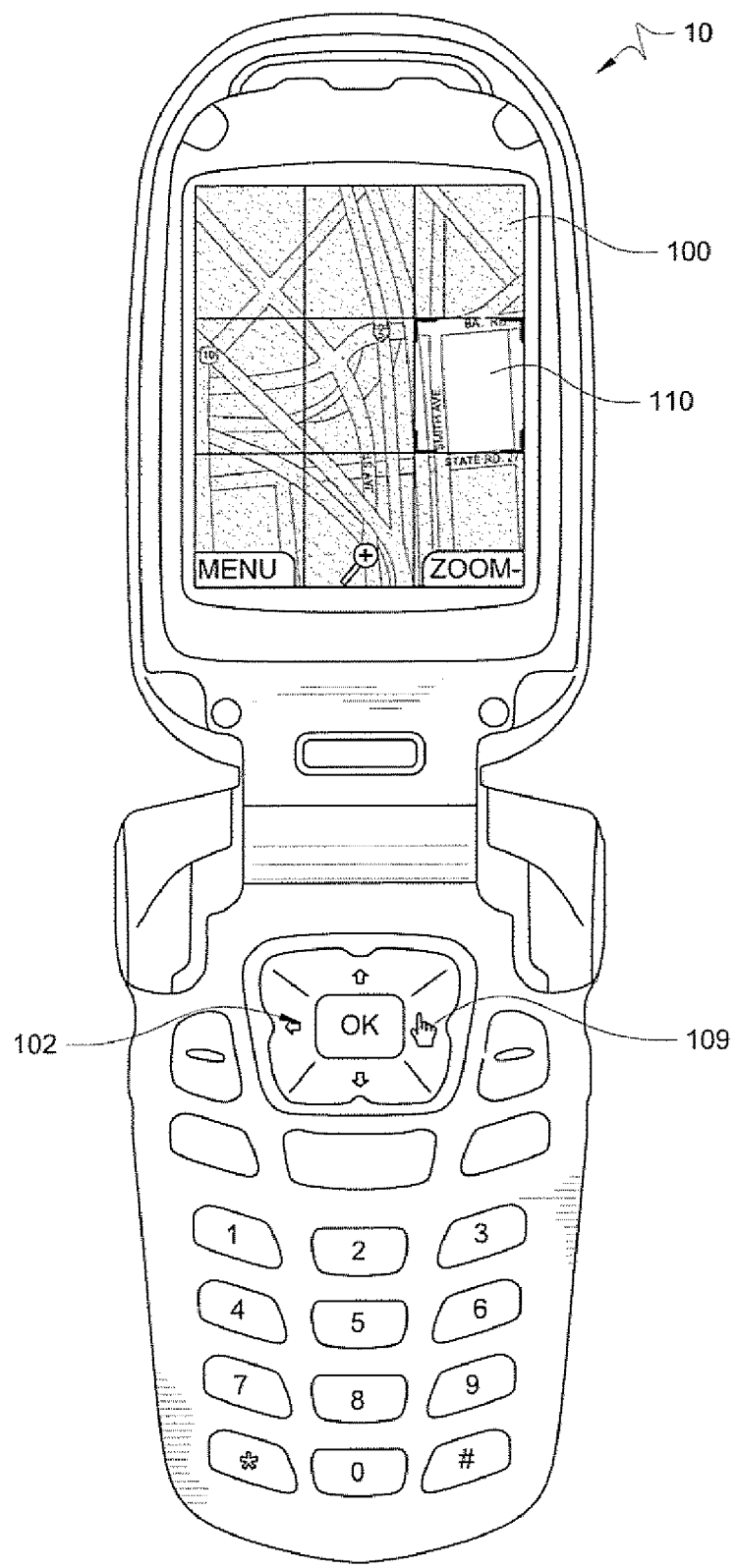
FIG. 1E is a diagram illustrating the mobile phone of FIG. 1D operating another panning feature according to one embodiment of the present invention.

With reference now to FIG. 1E if the user next desires to pan to the right, he or she manipulates navigation pad 102 at point 109 (i.e., activates the right directional-input button 109). When the entry at point 109 is received, the panning function places a second set of visual indicators, such as shading, over each of the display sections defined by the grid lines 103-106 (in FIG. 1D), except for section 110. This shading de-emphasizes each of the sections created by grid lines 103-106, except for section 110, which was determined by the panning function to be the section of interest. As the right-most section of map 101 displayed on display 100, this is the section (i.e., section 110) that will be moved to the center of the display, and then the shading, is removed in a manner similar to that described above when the user panned up. A result of such panning to the right is shown on display 100 in FIG. 2A.

It should be noted that the addition of the grid lines and shading provides sets of visual indicators that convey information to the user regarding what will happen once the user selects a particular navigation unction and then will give feedback to the user as the navigation function is executing in order to help the user maintain context. With the grid lines, once the user sees the operation of the navigation, he or she will understand what will happen with each navigation selection even before the navigation selection is made. The shading also provides the feedback that focuses the user attention on the selected section allowing him or her to more easily follow the execution of the navigation function in context with the original state of the selected section. Thus, the user is provided with a natural and intuitive experience.

Figure 2A:
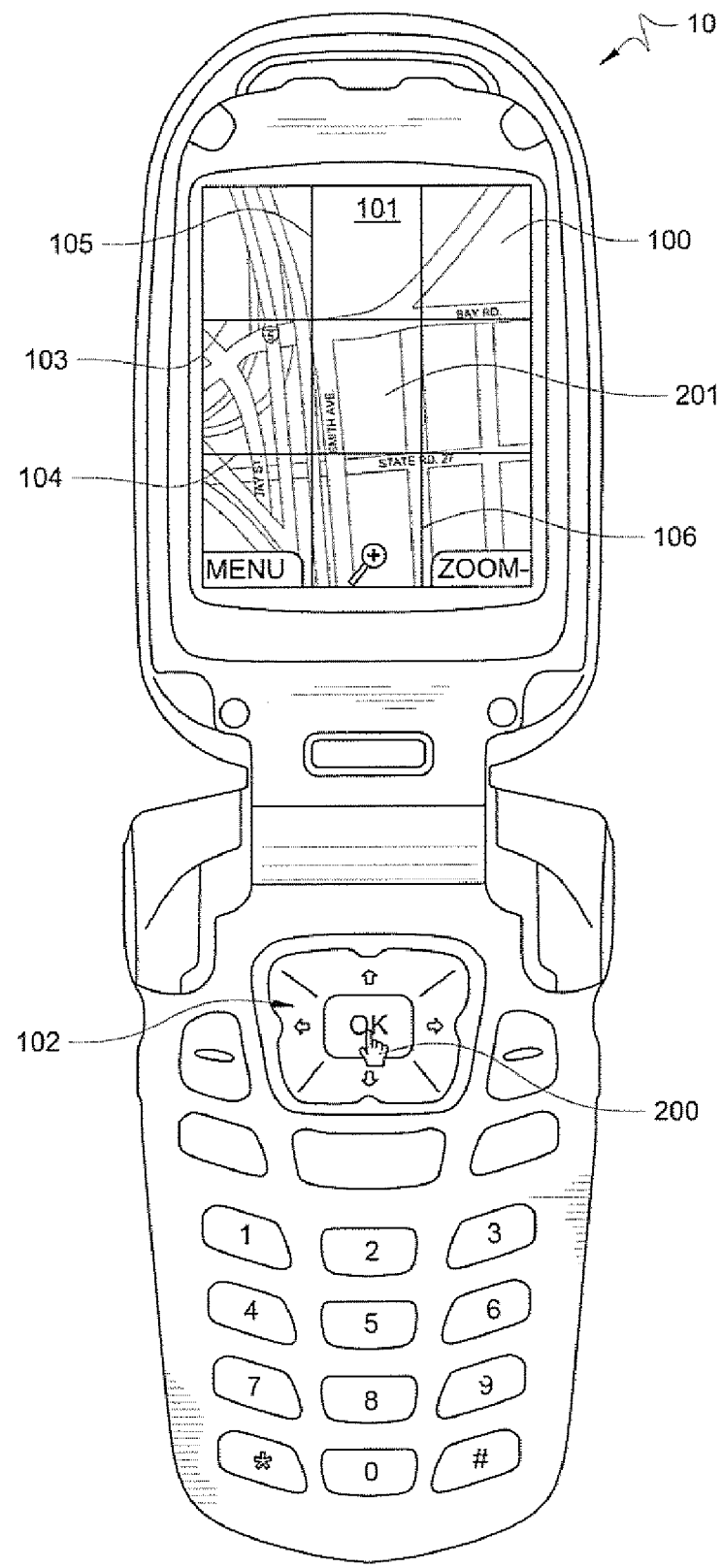
FIG. 2A is a diagram illustrating the mobile phone of FIG. 1A operating the zoom-in feature configured according to one embodiment of the present invention.
Figure 2B:
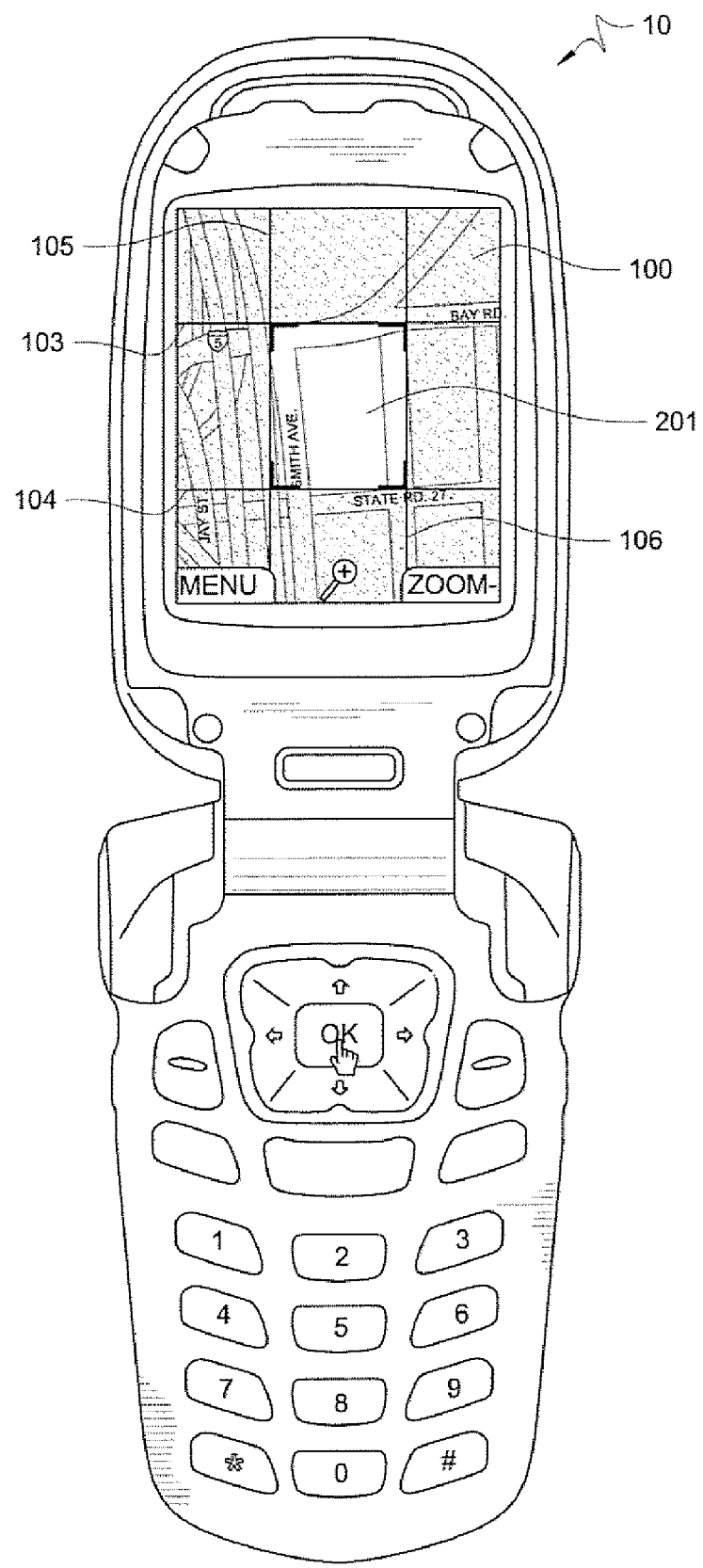
FIG. 2B illustrates the display of the mobile phone of FIG. 1A after the user activates the navigation feature.

The example of FIGS. 2A-2D illustrate an exemplary zoom-in function that is supported by the navigation application according to one embodiment of the present invention. FIG. 2A is a diagram illustrating mobile phone 10 operating the navigation application according to one embodiment of the present invention. In addition to panning around map 101 (in the manner discussed above with FIGS. 1A-1E), the navigation system in the map application operating in mobile phone 10 provides for zooming in or magnifying to view a more detailed level of map 101. With the area of interest centered at section 201, defined by grid lines 103-106, the user activates navigation pad 102 at point 200. FIG. 2B illustrates display 100 of mobile phone 10 after the user activates point 200 of navigation pad 102. Upon activation of the zoom-in function, shading is rendered over the other display sections created by grid lines 103-106 except for section 201. Section 201 also begins to enlarge, thus, magnifying the portion of map 101 that is displayed in section 201. The shading provides visual indication to the user of the steps that are taking place on the zoom-in. First, it highlights that the area of interest is found in section 201 because it remains un-shaded, and second, as the map application animates the enlargement or magnification of the portion of map 101 within section 201, the shaded portions appear to the user to be moving off of the visible area of display 100, thus, providing the user with a context of enlarging or zooming-in from the original point of view.

Figure 2C:
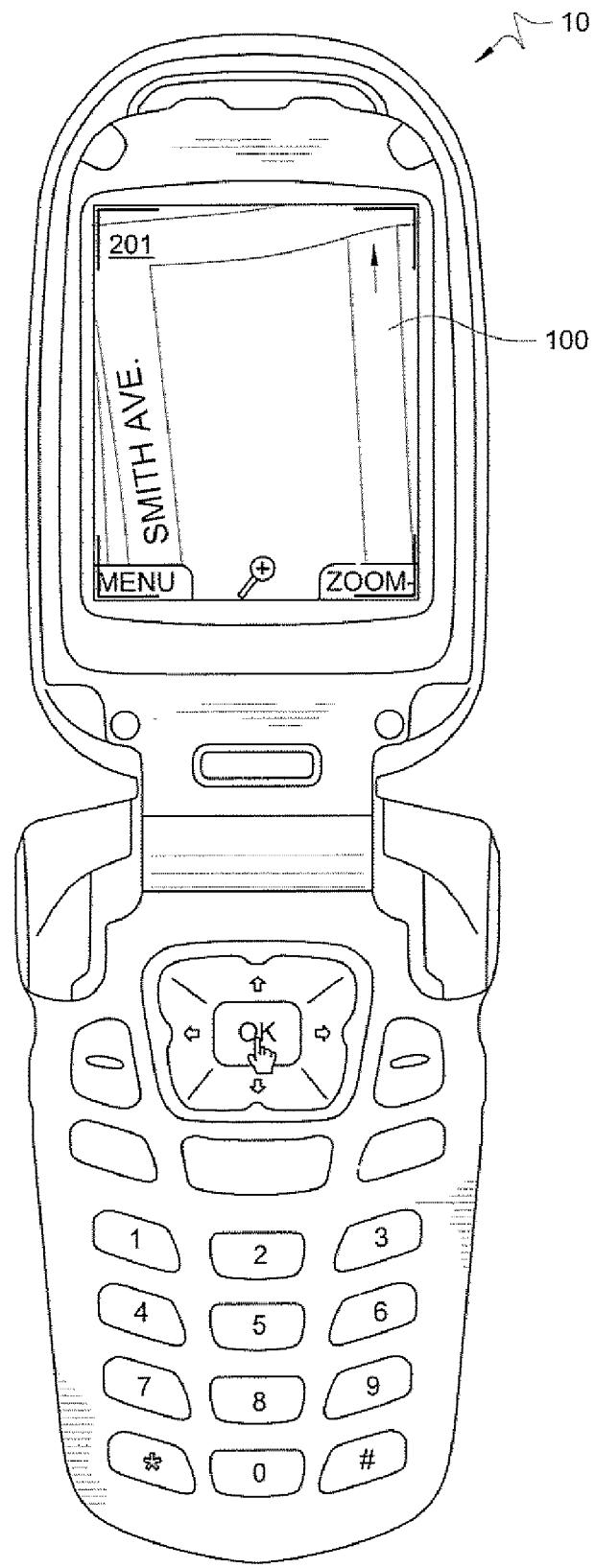
FIG. 2C is a diagram illustrating the mobile phone of FIG. 1A after the selected section has been fully enlarged or magnified to fit the entirety of the display.
Figure 2D:
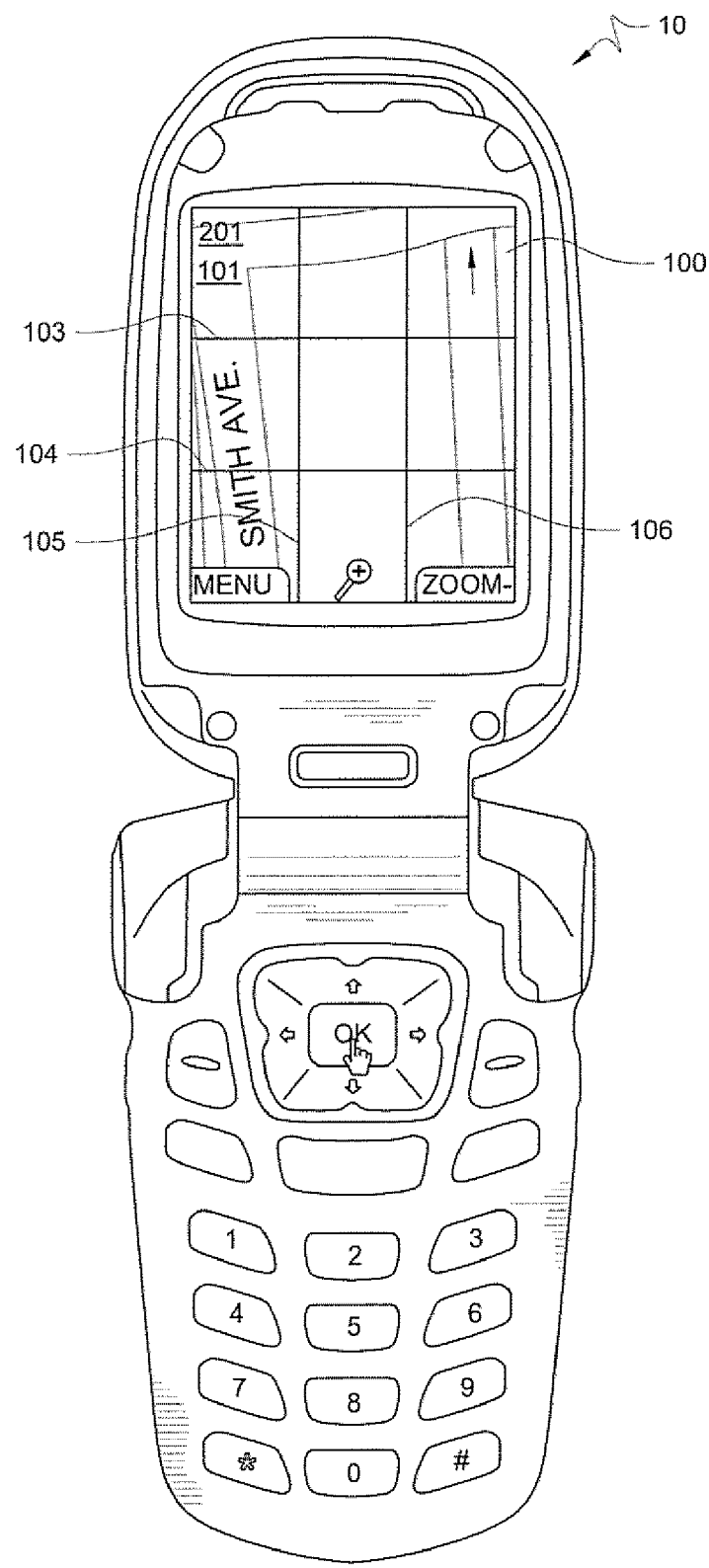
FIG. 2D is a diagram illustrating the mobile phone of FIG. 1A operating the zoom-in feature configured according to one embodiment of the present invention.

FIG. 2C is a diagram illustrating mobile phone 10 after section 201 has been fully enlarged or magnified to fit the entirety of display 100. When mobile phone 10 completes animating section 201 to its complete size, it appears on display 100 without grid lines 103-106, thus, indicating to the user that section 201 has been fully zoomed into. FIG. 2D, is a diagram that illustrates the next step of the zoom-in unction according to this exemplary embodiment, in which grid lines 103-106 are replaced on top of enlarged section 201 and dividing it into nine additional sections. Here, the user may select to continue navigating through the display data by, as examples, zooming into one of the new sections, may choose to pan around map 101 at the new, more magnified level, or may choose to zoom out to view a less magnified level.

Figure 3A:
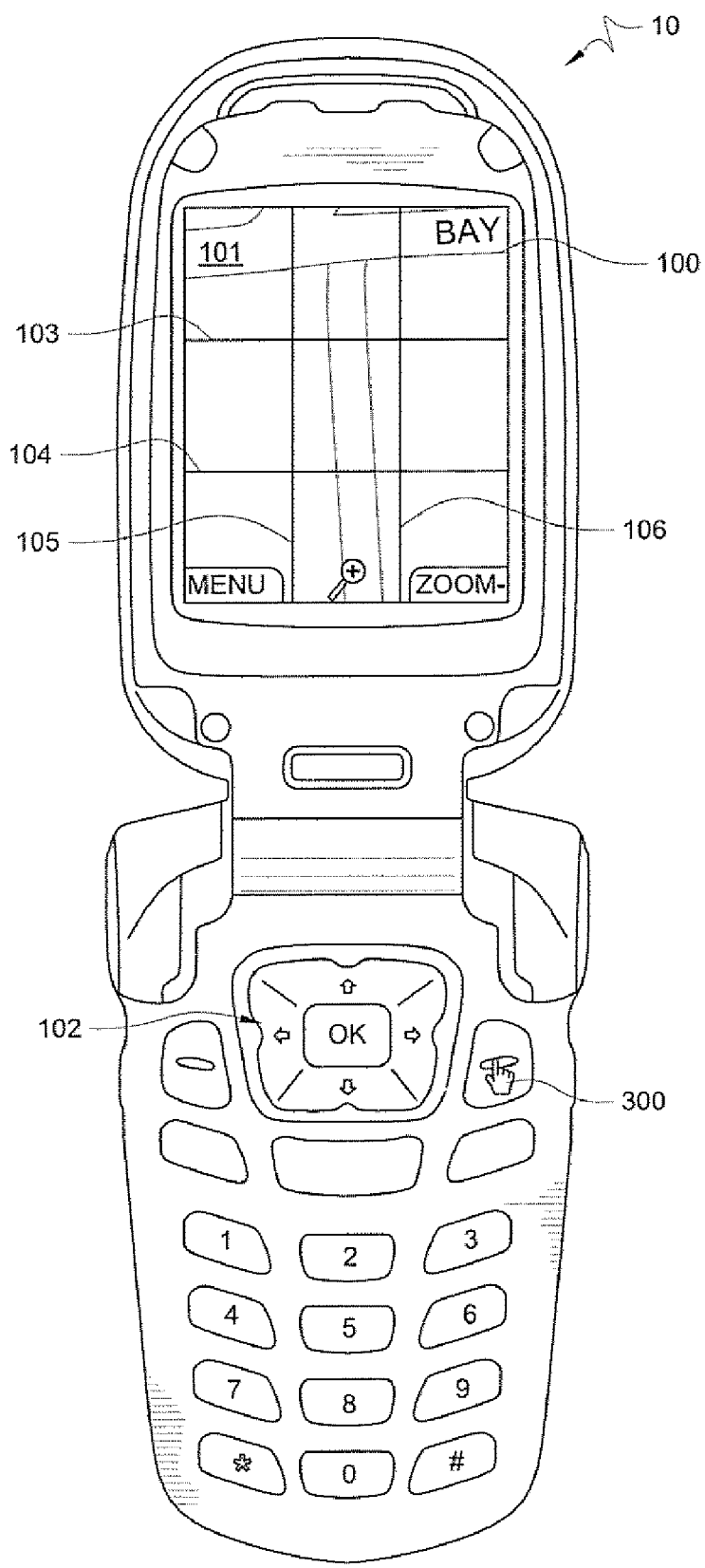
FIG. 3A is a diagram illustrating the mobile phone of FIG. 1A operating a zoom-out feature configured according to one embodiment of the present invention.
Figure 3B:
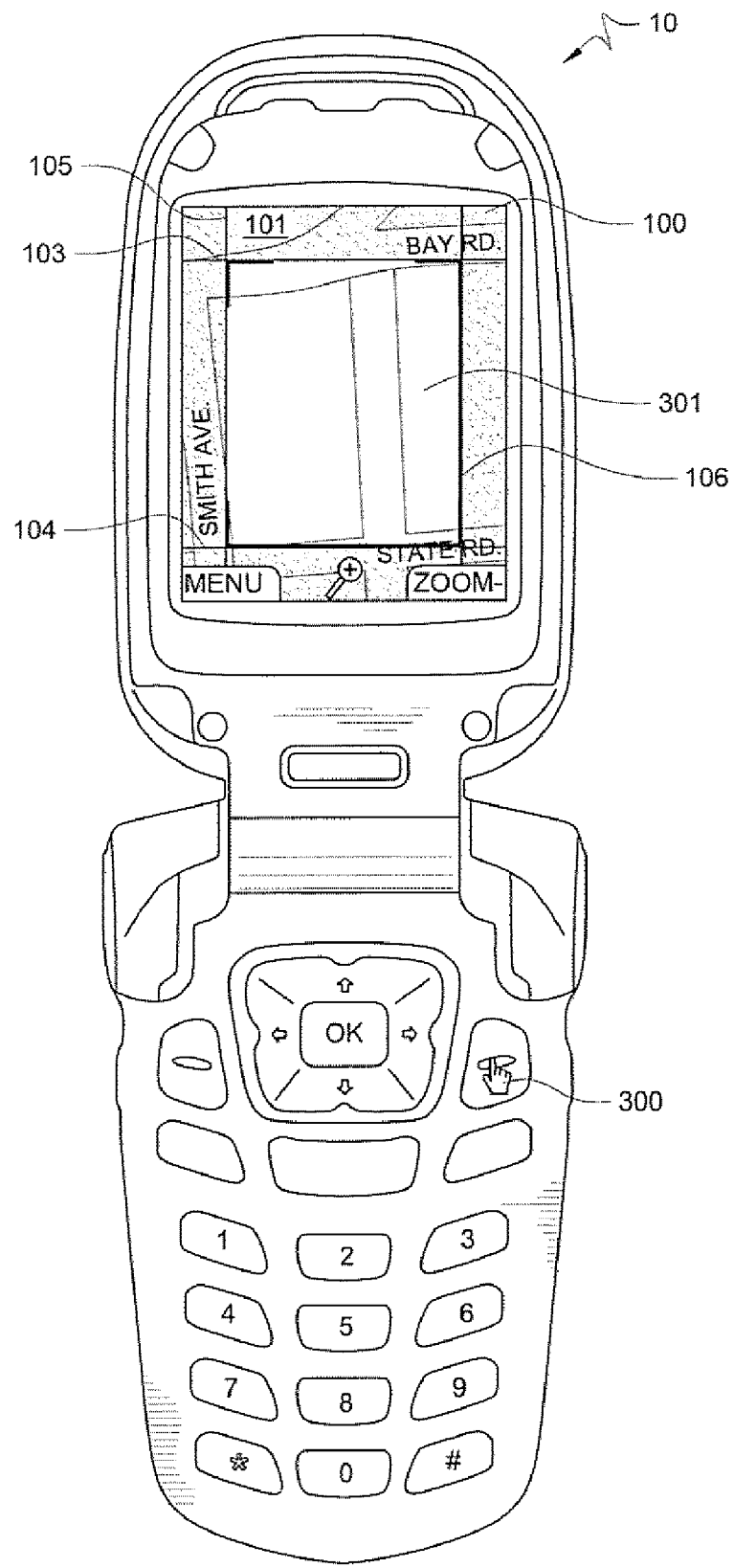
FIG. 3B is a diagram illustrating the mobile phone of FIG. 1A operation a zoom-out feature configured according to one embodiment of the present invention.

The example of FIGS. 3A-3D illustrate an exemplary zoom-out function that is supported by the navigation application according to one embodiment of the present invention. FIG. 3A is a diagram illustrating mobile phone 10 operating the navigation application according to one embodiment of the present invention. In addition to providing a zoom-in function that magnifies the parts of map 101 (as in the example discussed above with FIGS. 2A-2D), the navigation application may further provide for zooming out to view a less detailed or de-magnified level of map 101. According to the exemplary embodiment shown in FIG. 3A, the navigation application provides for a zoom-out function when the user activates soft key 300. Instead of focusing on a single section defined by grid lines 103-106, the zoom-out function's area of interest is the content displayed in a plurality of the sections displayed, such as all of the sections defining display 100 in this example. FIG. 3B is a diagram that illustrates the beginning of the zoom-out function after the user selects soft key 300. Because the entire content of display 100 will be reduced, grid lines 103-106 (FIG. 3A) are removed from the original display and instead are moved outside of the visible area of display 100, such that their new intersections form section 301 as the new center section, which, as illustrated in FIG. 3A at the beginning of the zoom-out function, encompasses the entire content of display 100. In this example, the underlying map image remains constant while the grid lines 103-106 are animated and moved so as to make a larger portion of the image be contained in the center block 301. In this example, the center block 301 is expanded beyond that shown in FIG. 3B to encompass the entire display data that is visible on display 100 in FIG. 3B.

Further, in this exemplary embodiment; the navigation application animates the reduction process by shrinking the part of map 101 within section 301. As section 301 is reduced, the additional sections formed by grid lines 103-106 are added to display 100 in order to maintain the context of the map portion displayed in section 301 being a contiguous part of the whole map 101. These additional sections outside of section 301 are added to display 100 with shading to provide a visual indicator to the user that the context of the operation is zooming out to reveal a less detailed, less magnified part of map 101. Also, beneath the shading that is provided, the additional parts of map 101 that correspond to the surrounding area of map 101 shown in section 301 are also rendered on display 100. The un-shaded section 301 is animated to become smaller and smaller while the shaded area overlaying the remaining sections formed by grid lines 103-106 and their corresponding parts of map 101 become larger in relation to display 100.

Figure 3C:
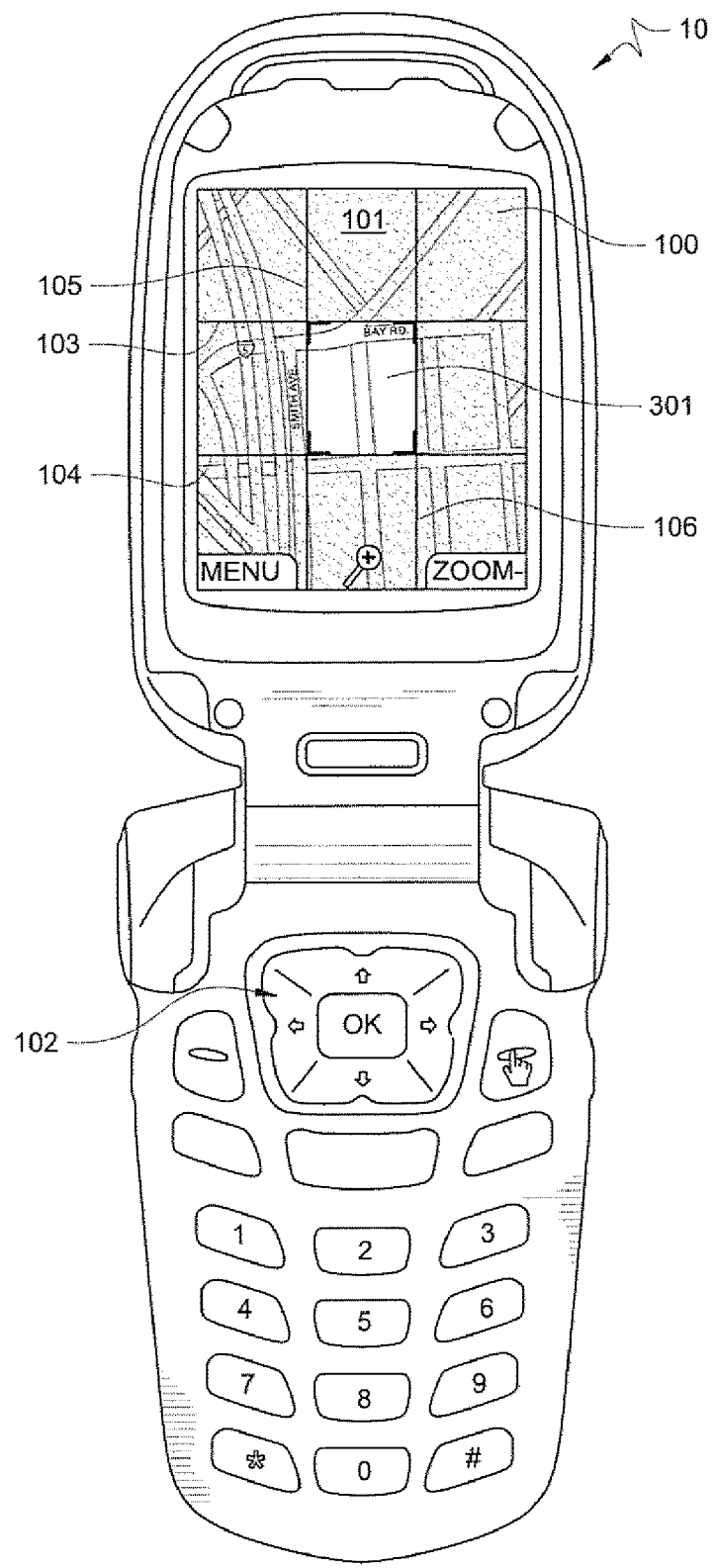
FIG. 3C is a diagram illustrating the mobile phone of FIG. 1A operating a zoom-out feature configured according to one embodiment of the present invention.
Figure 3D:
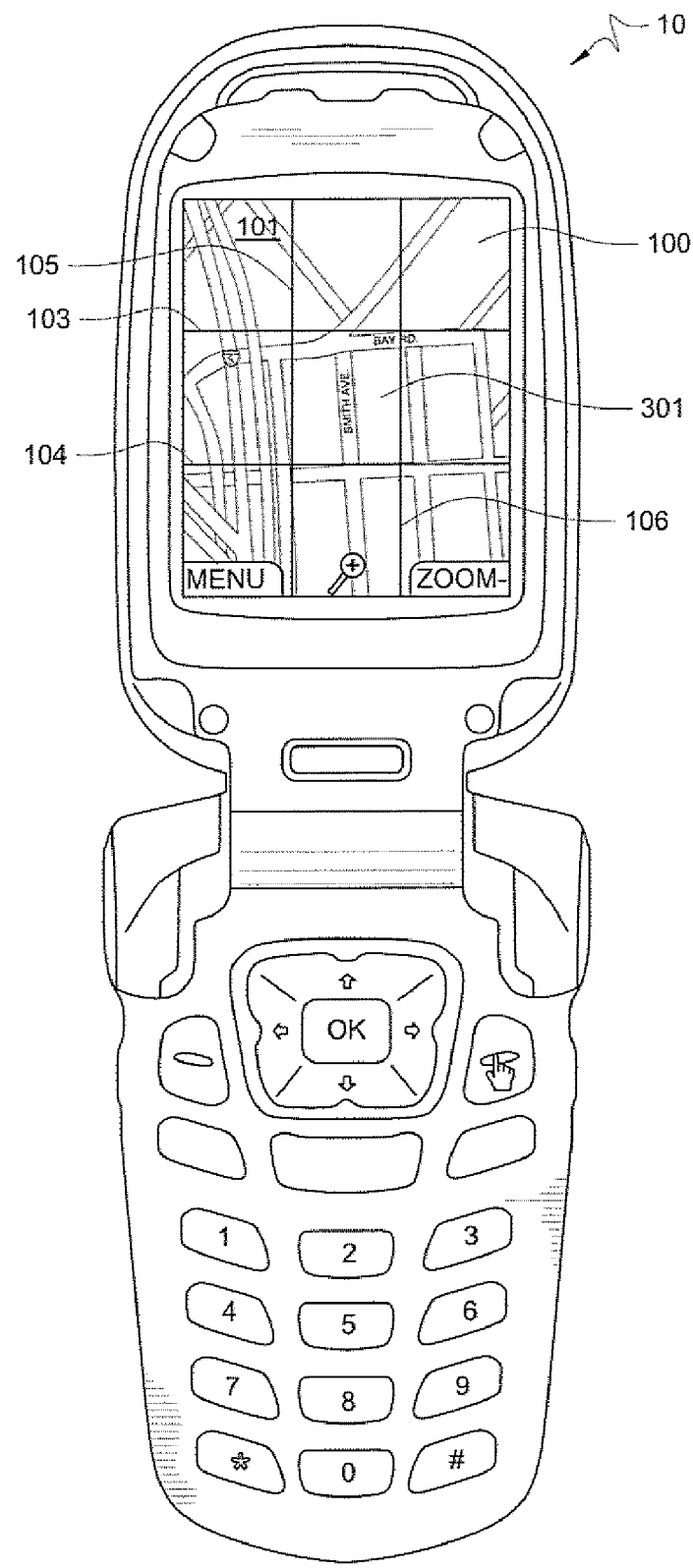
FIG. 3D is a diagram illustrating the mobile phone of FIG. 1A operating a zoom-out feature configured according to one embodiment of the present invention.

FIG. 3C is a diagram illustrating map 101 after zooming out from the previous display of section 301 (of FIG. 3B). Section 301 is now visible as the center section of the nine sections of display 100 formed by grid lines 103-106, which gridlines 103-106 have now been returned to their typical location on display 100. The shading is still covering the other sections as an indicator to the user of the particular feature process that has been executed. After a predetermined time displaying the shading to the user, the navigation application running on mobile phone 10 removes the shading and displays map 101 in its new view aspect, as illustrated in the diagram of mobile phone 10 in FIG. 3D.

Thus, in the exemplary embodiment of zooming-out shown in FIGS. 3A-3D, the visual indicators (e.g., grid lines) surrounding a center section of display data are animated and moved over the underlying display data until the visual indicators defining the center section encompass a larger area of the display (e.g., the full display 100), such as in FIG. 3B wherein the grid lines are expanded outward to result in the center section 301 including all of the map data currently shown on display 100. The visual indicators are then animated and moved back to their original size, shrinking the display data contained therein, thereby resulting in the map data of display 100 shown in FIG. 3B being contained within the re-sized center section 301 in FIG. 3C. And, as discussed above, the adjacent display data that was not visible on display 100 in FIG. 3B becomes visible in FIGS. 3C-3D, as a result of this zoom-out operation.

The grid lines disclosed as a part of the various embodiments of the present invention may be rendered on the display screen may be spaced equally and may define 9 equal sections of the display. However, as noted above, the grid lines may also be rendered in such a way that they generate more or fewer than 9 sections and may generate sections of varying sizes.

While the above examples show navigation through map data presented by a mapping application, embodiments of the present invention are not limited in application for navigation through a map, but may additionally or alternatively be employed for navigating through any type of display data (e.g., document, image, photograph, video games, etc.). Furthers while the above examples show the navigation application as being employed on a mobile telephone 10, embodiments of the present invention are not limited in application for use on a mobile telephone, but may additionally or alternatively be employed on other types of electronic devices, including without limitation personal computers, laptop computers, PDAs, portable media players, digital cameras, video cameras, gaming devices (e.g., portable video gaming devices), etc.

While embodiments of the present invention are not limited in application to any particular type of data or display device, exemplary techniques employed by embodiments of the navigation application may be particularly advantageous for use in navigating through display data in certain environments. For instance, the navigation application of certain embodiments may be particularly advantageous for use in navigating through display data presented on a small-screen display, such as small-screen display 100 of mobile telephone 10 shown in FIGS. 1-3. Additionally or alternatively, the navigation application of certain embodiments may be particularly advantageous for use in navigating through display data presented by a system in which user input for navigation control is limited. For instance, many electronic devices, such as mobile telephone 10, often have limited support for user input for controlling navigation through display data. For example, the user input may be limited to directional input (e.g., up, down, left, and right) and selection input (e.g., an "OK" button), such as that provided by 5-way interface 102 of mobile telephone 10 (shown in FIG. 1A), and button 300 of mobile telephone 10 shown in FIG. 3A. Various other input device configurations provide limited user input mechanisms for navigating through display data (such as the navigation wheel 416 provided by device 40 in FIG. 4A, discussed below). Additionally, in some instances, even though a device, such as a personal computer, may provide great flexibility to a user in inputting navigation commands (e.g., may enable input using a mouse, etc.), a user may desire to use a more limited subset of input mechanisms, such as the directional inputs (e.g., up, down, left, and right arrows on a keyboard) and selection input (e.g., Enter key on the keyboard) to perform navigation functions for navigating through display data, wherein certain embodiments of the navigation application may be employed in any such environment to assist a user's navigation through display data.

In certain embodiments, the navigation application analyzes the display data and determines the visual indicators to display based on the display data. For example, in one embodiment, the visual indicators are determined to divide the display data into a plurality of sections, wherein the sections may be of different sizes depending on the concentration of display data presented at the corresponding portion of the display. For instance, a greater number of smaller sections may be formed for areas of the display which contain highly concentrated display data, whereas a fewer number of larger sections may be formed for areas of the display that contain less concentrated display data. In this manner, in certain embodiments the visual indicators generated by the navigation application may dynamically vary depending on the display data being presented on the display.

Figure 4A:
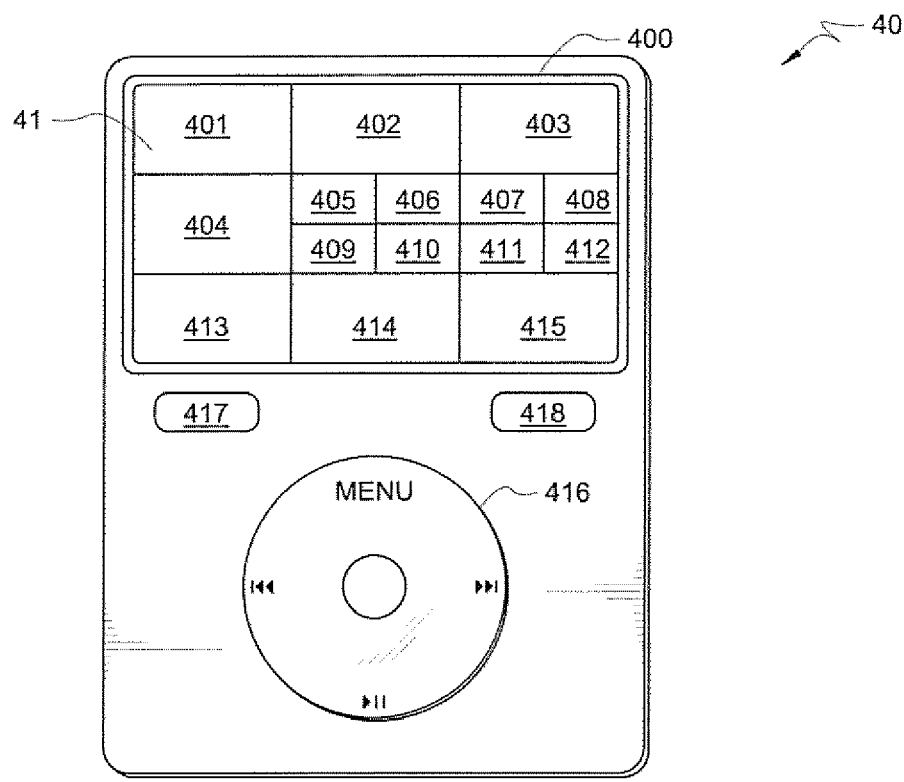
FIG. 4A is a diagram illustrating a media device including a view application including a navigation feature configured according to one embodiment of the present invention.

FIG. 4A is a diagram illustrating media device 40 (e.g., portable media player, such as an iPod™, a digital camera, etc.) including a view application with a navigation application configured according to one embodiment of the present invention executing thereon. Media device 40 may be any type of media device, whether used primarily as a personal music player, personal video player, gaining device, digital camera, or the like. In the present example, media device 40 is displaying one section or portion of a larger document, such as a photograph. The actual photograph is not illustrated in FIG. 4A in order to present more clear detail of the operation of the illustrated embodiment of the present invention. The view application, which allows the user to view the photograph on media device 40, renders grid lines on display 400 that define sections 401-415. The navigation application in this example receives input from navigation wheel 416 and function buttons 417-418 to allow the user to issue navigation signals to navigate around the photograph.

In this exemplary embodiment, the navigation application contains logic that analyzes the graphic image, such as the photograph displayed on media device 40, to determine the plurality of sections to be defined by the grid lines based at least in part on the concentrations of the display data being presented. For instance, in this example, the logic analyzes the graphic image and determines the high-data areas, e.g., areas that include substantial variations in colors, multiple edges, and the like, as distinguished from low-data areas e.g., areas that repeat the same color or have very little variation in pixel data. Based on the analysis of the graphic image, such as the photograph, the view application generates grid lines and grid sections that may allow a more granular ability to navigate the more high-data areas, while maintaining a minimum navigation ability of the low-data areas. Thus, the generation of the grid lines for defining the sections may dynamically vary based on the underlying data concentrations. In other words, the section sizes may dynamically vary in relation to the concentration of underlying data being displayed. In the example illustrated in FIG. 4A, the navigation application has created additional smaller (or finer) sections in the area covered by sections 405-412. The part of the photograph beneath sections 405-412 are more high-data than the other sections, in this example.

Figure 4B:
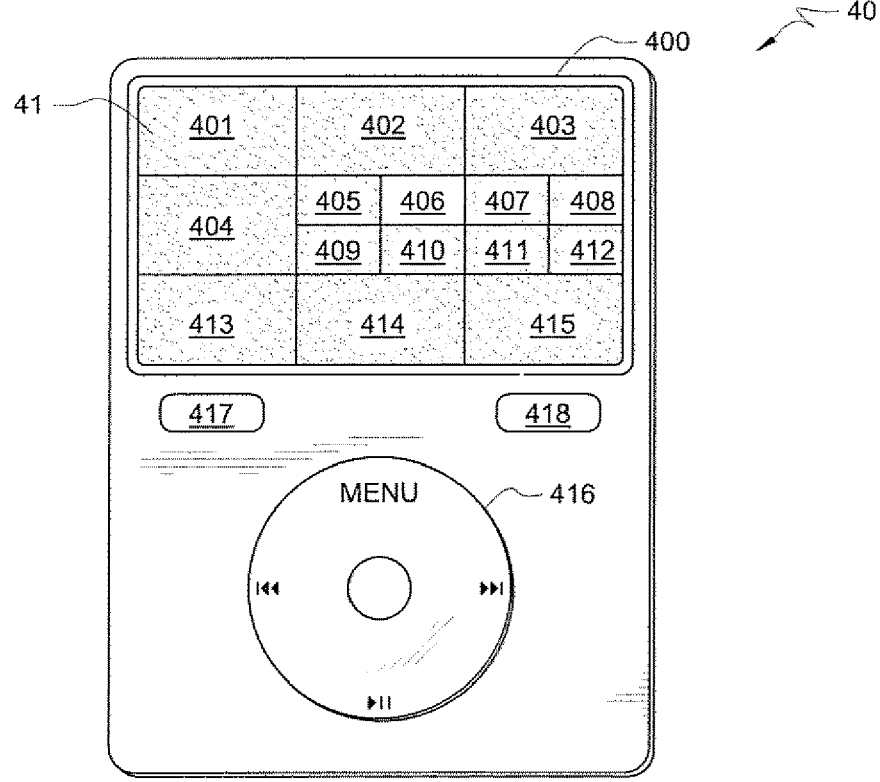
FIG. 4B is a diagram illustrating a media device including a view application including a navigation feature configured according to one embodiment of the present invention.
Figure 4C:
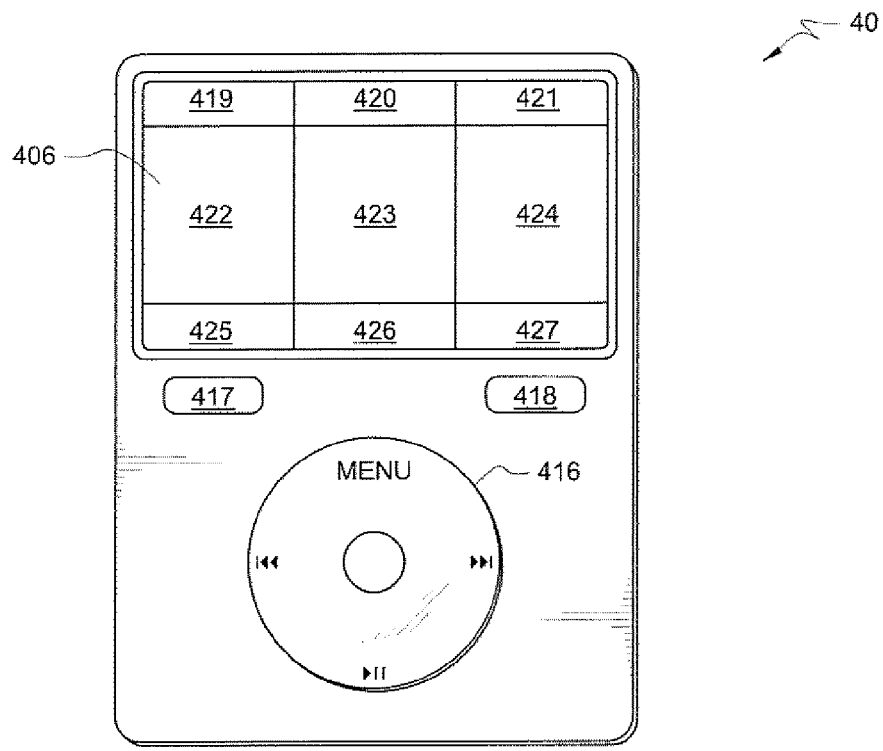
FIG. 4C is a diagram illustrating a media device including a view application including a navigation feature configured according to one embodiment of the present invention.

In operation, suppose the user desires to zoom into the portion of the photograph within section 406. The user rolls his or her finger around navigation wheel 416, which is touch-sensitive, to cycle between each of sections 401-415. When the user stops on section 406, he or she clicks on the center button of navigation wheel 416 to select to zoom into section 406. FIG. 4B is a diagram illustrating media device 40 after the user selects to zoom into section 406. On the selection of the zoom feature, the navigation application renders shading over each of the sections on display 41 except section 406 to indicate to the user that the area of interest is section 406. The navigation application then animates the zooming process by making section 406 larger until it fits within display 41. During this animation, the shaded region of sections 401-405 and 407-415 along with those sections are moved from the visible region of display 41. FIG. 4C is a diagram illustrating media device 40 when the zooming function has been completed. On completion, the shading is no longer present, because all of the shaded regions have been moved off of the visible area of display 400, and a new set of grid lines are overlaid on the content of section 406, thus, creating new sections 419-427. Again, the new sections 419-427 may be of varying size depending on their respective underlying display data concentrations.

Figure 5:
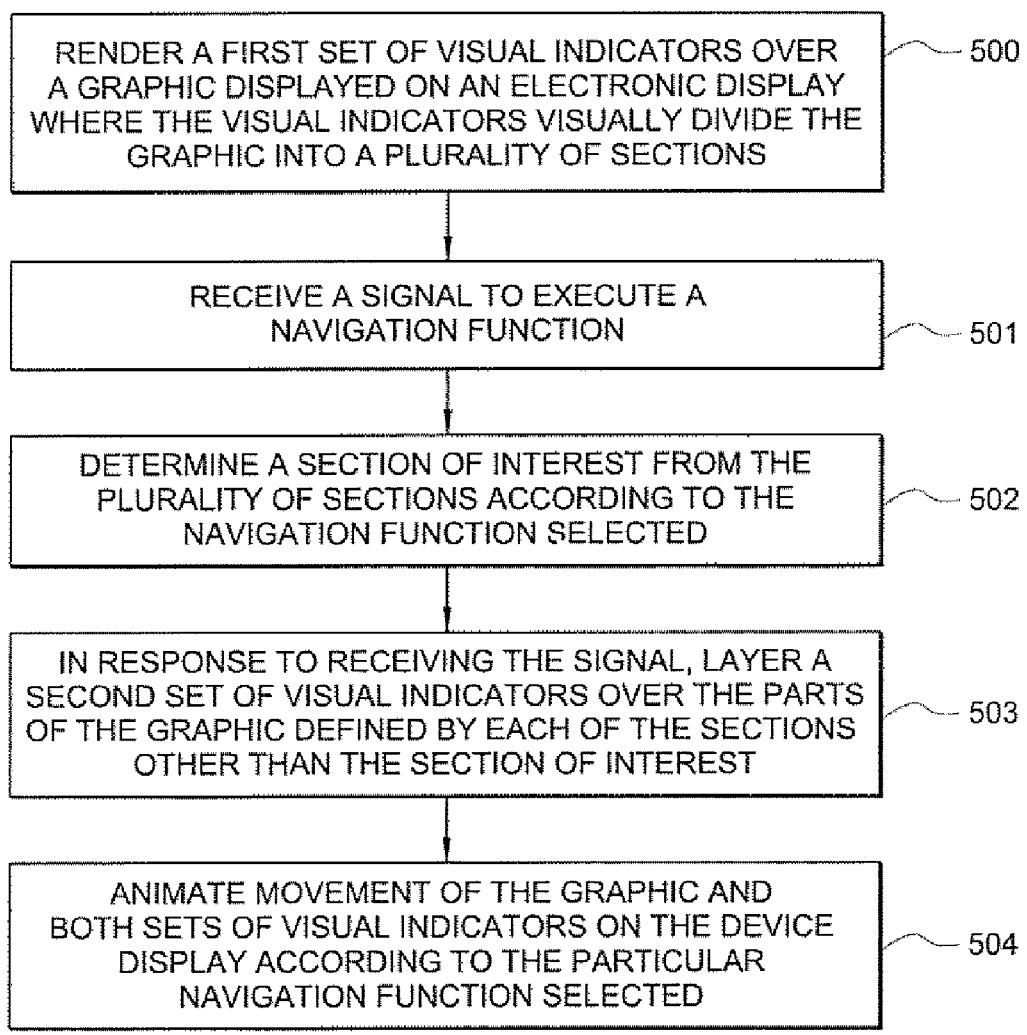
FIG. 5 is a flowchart illustrating an operational flow of a navigation application according to one embodiment of the present invention.

FIG. 5 is a flowchart illustrating an exemplary operational flow of a navigation application according to one embodiment of the present invention. In operational block 500, a first set of visual indicators is rendered over a graphic displayed on an electronic display, where the visual indicators visually divide the graphic into a plurality of sections. In certain embodiments, the electronic display is a small-screen display on which the graphic is displayed, such as commonly included for such electronic devices as mobile telephones, PDAs, digital cameras, portable media players, video cameras, portable gaming devices, etc. Thus, in many cases, the graphic being displayed is a subpart of a larger graphic that is too large to fit completely on the display.

A signal is received, in step 501, to execute a navigation function. Such navigation function may comprise a panning function, zoom-in function, or zoom-out function, as examples. The signal may be received by the navigation application in response to user input to an electronic device indicating a desired navigation unction to be initiated to navigate to a desired display of the graphic data.

A section of interest is determined from the plurality of sections, in step 502, according to the selected navigation function. In step 503, a second set of visual indicators is layered over the parts of the graphic defined by each unselected sections. In step 504, movement of the graphic and both sets of visual indicators is animated on the device display according to the particular navigation function selected.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
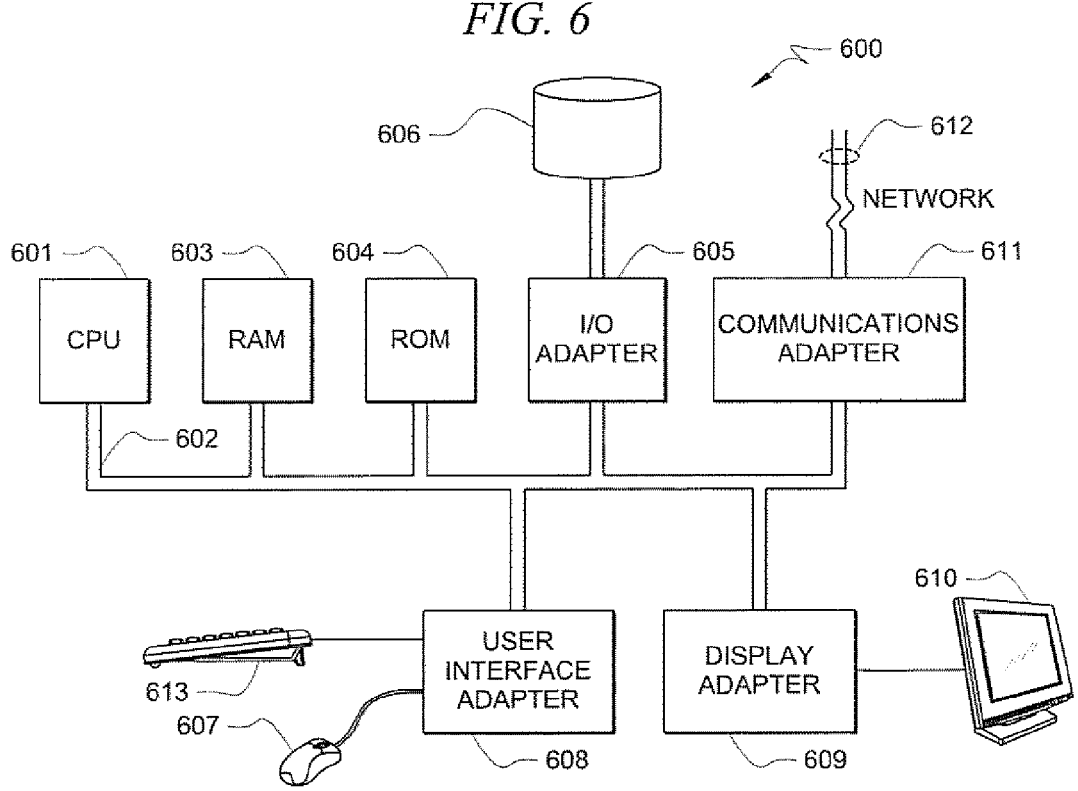
FIG. 6 illustrates an exemplary computer system adapted to use embodiments of the present invention.

FIG. 6 illustrates an exemplary computer system 600 on which the navigation application may be implemented according to one embodiment of the present invention. Central processing unit (CPU) 601 is coupled to system bus 602. CPU 601 may be any general-purpose CPU. The present invention is not restricted by the architecture of CPU 601 (or other components of exemplary system 600) as long as CPU 601 (and other components of system 600) supports the inventive operations as described herein. CPU 601 may execute the various logical instructions according to embodiments of the present invention. For example, CPU 601 may execute machine-level instructions according to the exemplary operational flow described above in conjunction with FIG. 5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (S/O) adapter 605, communications adapter 611, user interface adapter 608, and display adapter 609. I/O adapter 605, user interface adapter 608, and or communications adapter 611 may, in certain embodiments, enable a user to interact with computer system 600 in order to input information, such as to indicate a desired navigation function to be performed for navigating through display data.

I/O adapter 605 preferably connects to storage device(s) 606, such as one or more of hard drive, compact disc (CD) drive, floppy disk drive, tape drive, etc. to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. The storage devices may be utilized when RAM 603 is insufficient for the memory requirements associated with storing data for operations of the navigation application. Communications adapter 611 is preferably adapted to couple computer system 600 to network 612, which may enable information to be input to and/or output from system 600 via such network 612 (e.g., the Internet or other wide-area network, a local-area network, a public or private switched telephony network, a wireless network, any combination of the foregoing). For instance, an application generating display data may execute remote from computer system 600 and such display data may be input to system 600 via network 612 from a remote computer, and/or navigation commands may be output and communicated via network 612 to a remote computer. User interface adapter 608 couples user input devices, such as keyboard 613 and pointing device 607 to computer system 600. Display adapter 609 is driven by CPU 601 to control the display on display device 610 to, for example, display the underlying data and navigation indicators (e.g., grid lines) provided by the navigation application according to certain embodiments of the present invention.

It shall be appreciated that the present invention is not limited to the architecture of system 600. For example, any suitable processor-based device may be utilized for implementing the exemplary embodiments of the navigation application described above, including without limitation personal computers, laptop computers, computer workstations, multi-processor servers, mobile telephones, PDAs, portable media players, etc. Moreover, embodiments of the present invention may be implemented on application specific integrated circuits (ASICs) or very large scale integrated (VLSI) circuits. In fact, persons of ordinary skill in the art may utilize any number of suitable structures capable of executing (logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
   rendering a set of visual indicators over a graphic displayed on an electronic display of a device, the device comprising a processor executing code stored on a computer-readable medium to cause the device to render the set of visual indicators over the graphic, wherein said set of visual indicators divides said graphic into a plurality of sections;
   determining a size of each section of the plurality of sections based at least in part on an amount of concentration of display data in a portion of the graphic contained within each section of the plurality of sections;
   receiving a signal to execute a navigation function associated with a section of interest of said plurality of sections; and
   responsive to receiving said signal, animating movement of said graphic and said set of visual indicators on the electronic display of the device according to said navigation function.

2. The computer-implemented method of claim 1 further comprising:
   returning said set of visual indicators to an original location on said display after said animation, wherein said set of visual indicators divides said moved graphic into a plurality of new sections.

3. The computer-implemented method of claim 1 wherein said graphic is a subpart of a larger graphic that is larger than said electronic display.

4. The computer-implemented method of claim 3 further comprising:
   removing a part of said graphic from a visible area of said display according to said movement; and
   inserting a replacement graphic part to said visible area of said display, wherein said replacement graphic part originates from said larger graphic not visible on said display, and wherein a combination of said remaining graphic and said replacement graphic fills said electronic display.

5. The computer-implemented method of claim 1 wherein said rendering comprises:
   rendering a set of intersecting grid lines over said graphic, wherein one or more intersections make said plurality of sections.

6. The computer-implemented method of claim 1 wherein said navigation function comprises at least one of:
   panning;
   zooming in; or
   zooming out.

7. The computer-implemented method of claim 6 wherein receiving the signal to execute the navigation function associated with the section of interest of the plurality of sections comprises:
   receiving the signal identifying a center section as said section of interest when said selected navigation function is one of: zooming in and zooming out; and
   receiving the signal identifying a center edge section as said section of interest when said selected navigation function is said panning wherein an edge associated with said identified center edge section corresponds to a direction of said panning.

8. The computer-implemented method of claim 1 wherein receiving the signal to execute the navigation function associated with the section of interest of the plurality of sections comprises:
   receiving a selection signal from a user indicating said section of interest.

9. The computer-implemented method of claim 1 further comprising:
   receiving edit input from a user to edit a location of said set of visual indicators; and
   re-rendering said set of visual indicators to said location on said display.

10. A computer-implemented method comprising:
    rendering a plurality of dividers over a graphic displayed on an electronic display of a device, the device comprising a navigation application stored on a computer-readable medium for causing the device to render the plurality of dividers over the graphic, said plurality of dividers defining a plurality of sections in the graphic;
    determining the plurality of sections based on the graphic by determining a size of a section of the plurality of sections based on an amount of concentration of display data contained in a corresponding portion of the graphic to be contained within the section;
    receiving at least one navigation signal for navigating said graphic, the at least one navigation signal identifying a section of interest from the plurality of sections and representing a navigating function, the section of interest comprising a portion of the graphic;
    de-emphasizing the plurality of sections other than the section of interest; and
    moving said graphic on said electronic display according to said navigation function, wherein moving the graphic comprises moving the portion of the graphic from the section of interest to a new section of interest of the plurality of sections.

11. The computer-implemented method of claim 10 further comprising:
    after said moving, re-rendering said plurality of dividers at an original position on said electronic display over a new portion of a new graphic, said new portion of the new graphic resulting from said moving.

12. The computer-implemented method of claim 10 further comprising:
    inserting additional portions of said graphic onto said electronic display to fill parts of said electronic display left empty by moved portions of said graphic.

13. The computer-implemented method of claim 10 wherein said plurality of sections are equal-sized.

14. The computer-implemented method of claim 10 wherein said navigation function comprises one or more of:
    moving laterally across said graphic;
    magnifying content of said portion of the graphic; or
    de-magnifying said content of said portion of the graphic.

15. The computer-implemented method of claim 14 wherein said navigation function comprises one of: said magnifying and said de-magnifying, said receiving the at least one navigation signal for navigating said graphic comprises:
    identifying one of said plurality of sections located at a center of said electronic display.

16. The computer-implemented method of claim 14 wherein said navigation signal comprises said moving laterally, said receiving the at least one navigation signal for navigating said graphic comprises:

identifying one of said plurality of sections located on a center edge of said electronic display wherein an edge associated with said identified one corresponds to a direction of said lateral movement.

17. The computer-implemented method of claim 10 wherein said receiving the at least one navigation signal for navigating said graphic comprises:

receiving a selection indication from a user identifying a specific one of said plurality of sections as said section of interest.

18. The computer-implemented method of claim 10 further comprising:

receiving edit signals from a user identifying a new location for one or more of said plurality of dividers; and repositioning said identified one or more of said plurality of dividers to said new location.

19. The computer-implemented method of claim 10 wherein said graphic is larger than said electronic display.

20. A computer program product having computer program logic stored on a computer-readable medium, said computer program product comprising:

code for rendering a first set of visual indicators over a graphic displayed on an electronic device, wherein said first set of visual indicators divides said graphic into a plurality of sections;

code for determining the plurality of sections based on the graphic comprising code for determining a size of a section of the plurality of sections based on an amount of concentration of display data contained in a corresponding portion of the graphic to be contained within the section;

code for receiving a signal to execute a navigation function associated with a section of interest of said plurality of sections, wherein the section of interest is determined based on the navigation function;

code, executable responsive to said signal, for layering a second set of visual indicators over a part of said graphic defined by each of said plurality of sections other than said section of interest; and code for animating movement of said graphic and said first and second sets of visual indicators on said electronic device according to said navigation function, wherein code for animating movement comprises animating movement of a portion of the graphic from the section of interest to a new section of interest of the plurality of sections.

21. The computer program product of claim 20 further comprising:

code for returning said first set of visual indicators to an original location on said display after said animation, wherein said first set of visual indicators visually divides said moved graphic into a plurality of new sections.

22. The computer program product of claim 20 wherein said graphic is a subpart of a larger graphic that is larger than a display of said electronic device.

23. The computer program product of claim 22 further comprising:

code for removing a part of said graphic from a visible area of said display according to said movement; and code for inserting a replacement graphic part to said visible area of said display, wherein said replacement graphic part originates from said larger graphic not visible on said display, and wherein a combination of said remaining graphic and said replacement graphic fills said display.

24. The computer program product of claim 20 wherein said code for rendering comprises:

code for rendering a set of intersecting grid lines over said graphic, wherein one or more intersections make said plurality of sections equal-sized.

25. The computer program product of claim 20 wherein said navigation function comprises at least one of:

panning;

zooming in; or zooming out.

26. The computer program product of claim 25 wherein said code for receiving the signal to execute the navigation function associated with the section of interest of the plurality of sections comprises:

code for identifying a center section as said section of interest when said selected navigation function is one of: zooming in or zooming out; and code for identifying a center edge section as said section of interest when said selected navigation function is said panning, wherein an edge associated with said identified center edge section corresponds to a direction of said panning.

27. The computer program product of claim 20 wherein said code for receiving the signal to execute the navigation function associated with the section of interest of the plurality of sections comprises:

code for receiving a selection signal from a user indicating said section of interest.

28. The computer program product of claim 20 further comprising:

code for receiving edit input from a user to edit a location of said first set of visual indicators; and code for re-rendering said first set of visual indicators to said location on said display.

29. A system comprising:

a mobile device comprising an electronic display, a processor and a navigation application stored on a computer-readable medium, wherein the processor is configured to execute the navigation application to cause the mobile device to:

render a plurality of dividers over a document portion displayed on the electronic display, said plurality of dividers visually dividing said document portion into a plurality of sections;

determine a size of each section of said plurality of sections based at least in part on an amount of concentration of display data contained in a corresponding portion of said document portion to be contained within each section of the plurality of sections;

receive a navigation signal for navigating said document portion, wherein said document portion is a portion of a document larger than said electronic display;

determine a section of interest from said plurality of sections, wherein said section of interest is indicative of said navigation signal; and move said document portion on said electronic display according to said navigation signal, wherein each of said plurality of sections other than said section of interest is visually de-emphasized during said move.

30. The system of claim 29 wherein said electronic display comprises a small-screen display.

31. The system of claim 29 wherein the mobile device is capable of:

after moving, re-rendering said plurality of dividers at an original position on said electronic display over a new document portion, said new document portion resulting from moving.

32. The system of claim 29 where the mobile device is capable of:

inserting additional portions of said document onto said electronic display to fill parts of said electronic display left empty by moved portions of said document portion moved off of said electronic display during moving.

33. The system of claim 29 wherein said plurality of sections are equal-sized.

34. The system of claim 29 wherein said navigation signal identifies at least one of:

moving laterally across said document;

magnifying content of said document portion; or de-magnifying said content of said document portion.

35. The system of claim 34 wherein said navigation signal identifies at least one of said magnifying or said de-magnifying, and wherein said mobile phone is capable of determining the section of interest from the plurality of sections by:

identifying one of said plurality of sections located at a center of said electronic display.

36. The system of claim 34 wherein said navigation signal identifies said moving laterally, and wherein the mobile phone is capable of determining the section of interest from the plurality of sections by:

identifying one of said plurality of sections located on a center edge of said electronic display wherein an edge associated with said identified one corresponds to a direction of said lateral movement.

37. The system of claim 29 wherein the mobile phone is capable of determining the section of interest from the plurality of sections by:

receiving a selection indication from a user identifying a specific one of said plurality of sections as said section of interest.

38. The system of claim 29 wherein the mobile phone is capable of:

receiving edit signals from a user identifying a new location for one or more of said plurality of dividers; and repositioning said identified one or more of said plurality of dividers to said new location.

* * * * *